United States Patent
Spinelli et al.

(10) Patent No.: US 7,530,466 B2
(45) Date of Patent: May 12, 2009

(54) TEMPERATURE SENSITIVE VALVE HAVING SHAPE MEMORY ACTUATOR

(75) Inventors: Thomas Spinelli, East Northport, NY (US); Jahangir S. Rastegar, Stony Brook, NY (US)

(73) Assignee: Omnitek Partners LLC, Bayshore, NY (US)

( * ) Notice: Subject to any disclaimer, the term of this patent is extended or adjusted under 35 U.S.C. 154(b) by 958 days.

(21) Appl. No.: 10/338,329

(22) Filed: Jan. 8, 2003

(65) Prior Publication Data

US 2003/0127413 A1 Jul. 10, 2003

Related U.S. Application Data

(60) Provisional application No. 60/346,551, filed on Jan. 8, 2002.

(51) Int. Cl.
*A47G 19/22* (2006.01)
*B65D 55/00* (2006.01)

(52) U.S. Cl. .................. 220/201; 220/714; 220/254.3; 220/713; 229/404; 229/906.1

(58) Field of Classification Search .................. 220/201, 220/714, 254.3, 711, 713; 215/311; 251/11; 236/50; 229/404, 906.1
See application file for complete search history.

(56) References Cited

U.S. PATENT DOCUMENTS

| | | | | | |
|---|---|---|---|---|---|
| 4,457,327 | A | * | 7/1984 | Pepper | 137/67 |
| 4,460,103 | A | * | 7/1984 | Rama et al. | 220/254.3 |
| 4,582,214 | A | * | 4/1986 | Dart et al. | 220/713 |
| 4,589,569 | A | * | 5/1986 | Clements | 220/380 |
| 5,096,082 | A | * | 3/1992 | Hoefler | 220/257.1 |
| 5,255,809 | A | * | 10/1993 | Ervin et al. | 220/89.1 |
| 5,706,972 | A | * | 1/1998 | Sousa | 220/714 |
| 5,967,409 | A | * | 10/1999 | Benedict | 236/92 R |
| 6,089,397 | A | * | 7/2000 | Van Melle | 220/270 |
| 6,612,456 | B1 | * | 9/2003 | Hundley et al. | 220/254.3 |
| 6,663,821 | B2 | * | 12/2003 | Seward | 264/512 |
| 6,689,486 | B2 | * | 2/2004 | Ho et al. | 428/610 |
| 2002/0061696 | A1 | * | 5/2002 | Blonder | 446/14 |
| 2002/0167989 | A1 | * | 11/2002 | Russo | 374/141 |
| 2003/0161972 | A1 | * | 8/2003 | Blonder | 428/1.1 |

* cited by examiner

*Primary Examiner*—Anthony D Stashick
*Assistant Examiner*—James N Smalley

(57) ABSTRACT

A valve for preventing the flow of fluid when the temperature of the fluid is above a predetermined threshold, the valve including: a body having at least one opening for allowing the fluid to pass when the temperature of the fluid is below the predetermined threshold; and a shape memory or bi-metal actuator for substantially closing the at least one opening when the temperature of the fluid is above the predetermined threshold to prevent the fluid from passing.

10 Claims, 7 Drawing Sheets

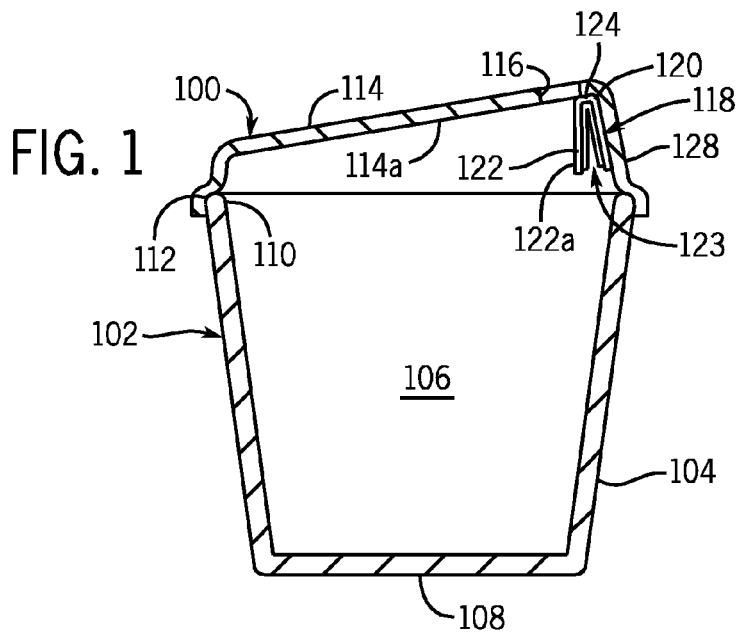
FIG. 1
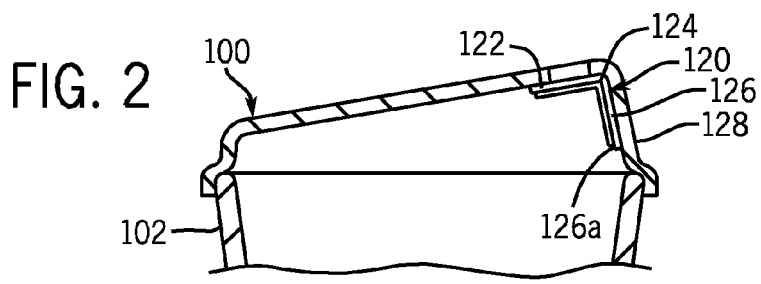
FIG. 2
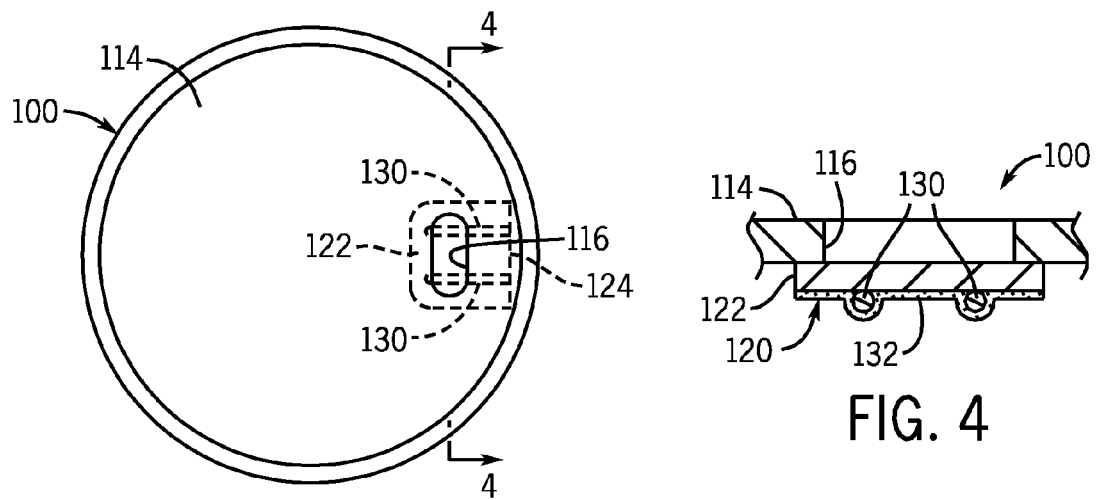
FIG. 3
FIG. 4

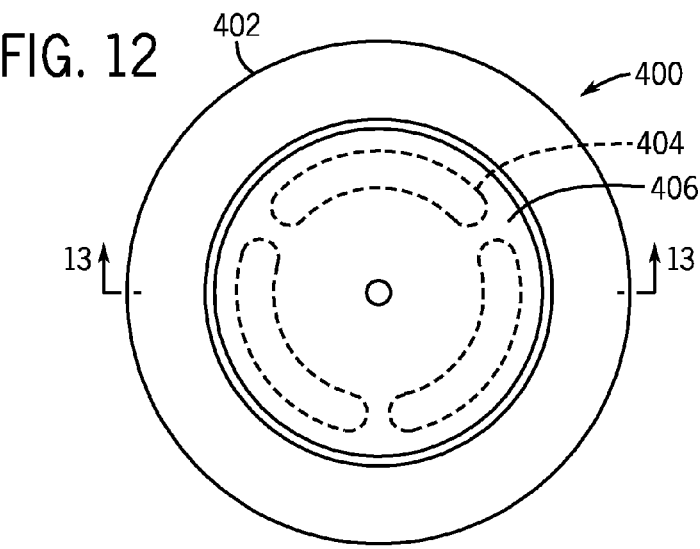
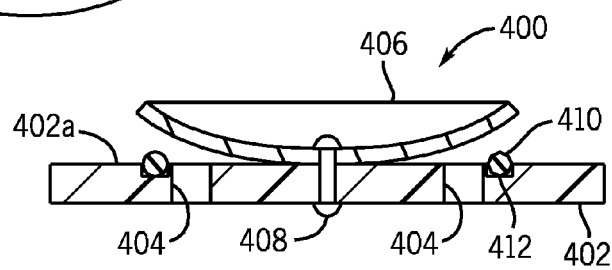
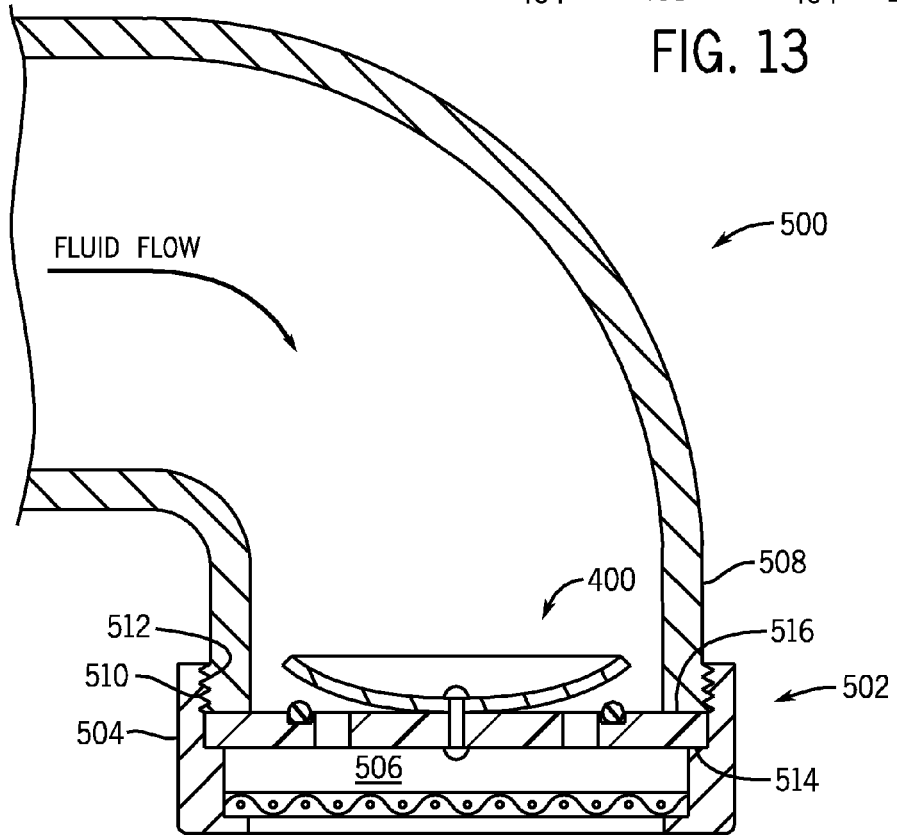

TEMPERATURE SENSITIVE VALVE HAVING SHAPE MEMORY ACTUATOR

CROSS REFERENCE TO RELATED APPLICATION

This application claims the benefit of U.S. Provisional Application 60/346,551 filed on Jan. 8, 2002, the entire contents of which is incorporated herein by its reference.

BACKGROUND OF THE INVENTION

1. Field of the Invention

The present invention relates generally to a safety valve for containers of hot fluids, and more particularly, to a safety valve for coffee containers and baby bottles which automatically prevent the dispensing of a fluid that has a temperature greater than a threshold temperature.

2. Prior Art

Many people are burned by hot coffee, tea, and hot chocolate drank from travel mugs and disposable coffee cups. Similarly, many people are burned from hot soup eaten from disposable containers. Furthermore, babies are sometimes burned by drinking baby formula that has been heated using a microwave oven or by boiling. Still others, particularly children, are burned by scolding hot water from a shower, sink, or bathtub.

There are currently no devices known in the art for preventing people from being burned from drinking or eating hot fluids from containers, particularly disposable containers and baby bottles. With regard to disposable containers, such a device must be reliable and inexpensive since it should also be disposable. With regard to the baby bottles, such a device should also be reliable and must also be able to withstand repeated sterilizations.

There are also devices known in the art for preventing scolding hot water from being dispensed in the bathtub, shower, and sink. However, these devices are generally complicated and expensive.

SUMMARY OF THE INVENTION

Therefore it is an object of the present invention to provide a safety valve for containers of hot liquids, which prevents the hot liquid from being dispensed if the hot liquid has a temperature, which could be harmful to a user of the container.

It is another object of the present invention to provide such safety valves, which are capable of withstanding repeated sterilizations.

It is yet another object of the present invention to provide a safety valve to prevent scolding hot water from being dispensed into a bathtub, sink, and shower.

It is still a further object of the present invention to provide such safety valves, which are inexpensive to fabricate.

Accordingly, a lid for a container of a hot fluid is provided. The lid comprises: a surface having an opening for dispensing the hot fluid; and a valve having an open position for dispensing the hot fluid and a closed position for substantially stopping the flow of the hot fluid from the container when a temperature of the hot fluid is more than a predetermined threshold temperature, the valve having a shape memory actuator which changes its shape in response to the hot fluid having a temperature above the threshold temperature to actuate the valve into the closed position.

Preferably, the lid further comprises means for attaching the lid to the container. Where the container is a cup having a cavity defined by a wall and a peripheral rim, the means for attaching the lid to the cup preferably comprises a lipped surface extending from the surface that sealingly engages the peripheral rim of the cup.

The valve preferably comprises a flap rotatably disposed on the lid by a hinge between the open and closed positions, wherein in the closed position, the flap covers the opening and substantially stops the flow of hot fluid from the cup, the shape memory actuator being disposed at the hinge to rotate the flap upon the change in shape. The opening preferably comprises a push-in tab defined by a perforation in the lid, which when pushed into the lid forms the opening.

Also provided is a container of a hot fluid. The container comprises: at least one wall defining a cavity for holding the hot fluid; a lid disposed on the wall to enclose the cavity, the lid having a surface, the surface having an opening for dispensing the hot fluid; and a valve disposed on one of the wall or lid, the valve having an open position for dispensing the hot fluid and a closed position for substantially stopping the flow of the hot fluid from the container when a temperature of the hot fluid is more than a predetermined threshold temperature, the valve having a shape memory actuator which changes its shape in response to the hot fluid having a temperature above the threshold temperature to actuate the valve into the closed position.

The container preferably further comprises means for attaching the lid to the container. Where the container is a cup and having a peripheral rim in fluid communication with the cavity, the means for attaching the lid to the cup comprises a lipped surface extending from the surface of the lid that sealingly engages the peripheral rim of the cup.

The valve preferably comprises a flap rotatably disposed on one of the wall or lid by a hinge between the open and closed positions, wherein in the closed position, the flap covers the opening and substantially stops the flow of hot fluid from the cup, the shape memory actuator being disposed at the hinge to rotate the flap upon the change in shape. Preferably, the opening comprises a push-in tab defined by a perforation in the lid, which when pushed into the lid forms the opening.

Still provided is a valve for preventing the dispensing of fluid from a baby bottle when the temperature of the fluid is above a predetermined threshold. The valve comprises: a body having at least one opening for allowing the fluid to pass from a bottle portion of the baby bottle to a nipple portion of the baby bottle when the temperature of the fluid is below the predetermined threshold; and a shape memory actuator for substantially closing the at least one opening when the temperature of the fluid is above the predetermined threshold to prevent the fluid from passing from the bottle portion to the nipple portion.

Preferably, the body is disk shaped the at least one opening comprises a plurality of openings. Preferably, at least some of the plurality of openings are arranged annularly about the disc.

The actuator preferably comprises a flap corresponding to the at least one opening, the flap being fabricated from a shape memory material and having a shape at a temperature below the determined threshold such that it does not occlude the at least one opening, the flap having a shape at a temperature above the determined threshold such that it does occlude the at least one opening to prevent the passage of fluid from the bottle portion to the nipple portion. The flap is preferably fabricated from a shape memory material that exhibits a two-way memory such that it has a first shape below the predetermined threshold so as not to occlude the at least one opening and has a second shape above the predetermined threshold so as to occlude the at least one opening.

Alternatively, the actuator comprises a flap corresponding to the at least one opening, the flap being fabricated from a shape memory material and having a cupped shape at a temperature below the determined threshold such that it does not occlude the at least one opening, the flap having a flat shape at a temperature above the determined threshold such that it does occlude the at least one opening to prevent the passage of fluid from the bottle portion to the nipple portion. The flap is preferably fabricated from a shape memory material that exhibits a two-way memory such that it has the cupped shape below the predetermined threshold so as not to occlude the at least one opening and has the flat shape above the predetermined threshold so as to occlude the at least one opening.

Still provided is a baby bottle comprising: a bottle portion having a cavity for holding a fluid; a nipple portion disposed on the bottle portion and in fluid communication with the cavity, the nipple portion having a nipple which when suckled dispenses the fluid; and a valve disposed between the bottle and nipple portions, the valve having a body having at least one opening for allowing the fluid to pass from the bottle portion to the nipple portion of the baby bottle when the temperature of the fluid is below a predetermined threshold, the valve further having a shape memory actuator for substantially closing the at least one opening when the temperature of the fluid is above the predetermined threshold to prevent the fluid from passing from the bottle portion to the nipple portion.

The body of the valve is preferably disk shaped and the valve is disposed between an upper lip of the bottle portion and a flange of the nipple portion. Preferably, the at least one opening comprises a plurality of openings where at least some of the plurality of openings are arranged annularly about the disc.

Preferably, the actuator comprises a flap corresponding to the at least one opening, the flap being fabricated from a shape memory material and having a shape at a temperature below the determined threshold such that it does not occlude the at least one opening, the flap having a shape at a temperature above the determined threshold such that it does occlude the at least one opening to prevent the passage of fluid from the bottle portion to the nipple portion. The flap is preferably fabricated from a shape memory material that exhibits a two-way memory such that it has a first shape below the predetermined threshold so as not to occlude the at least one opening and has a second shape above the predetermined threshold so as to occlude the at least one opening.

Alternatively, the actuator comprises a flap corresponding to the at least one opening, the flap being fabricated from a shape memory material and having a cupped shape at a temperature below the determined threshold such that it does not occlude the at least one opening, the flap having a flat shape at a temperature above the determined threshold such that it does occlude the at least one opening to prevent the passage of fluid from the bottle portion to the nipple portion. The flap is preferably fabricated from a shape memory material that exhibits a two-way memory such that it has the cupped shape below the predetermined threshold so as not to occlude the at least one opening and has the flat shape above the predetermined threshold so as to occlude the at least one opening.

Still provided is a valve for preventing the flow of fluid from an outlet when the temperature of the fluid is above a predetermined threshold. The valve comprises: a body having at least one opening for allowing the fluid to pass through the outlet when the temperature of the fluid is below the predetermined threshold; and a shape memory actuator for substantially closing the at least one opening when the temperature of the fluid is above the predetermined threshold to prevent the fluid from passing through the outlet. Preferably, the body is disk shaped and the at least one opening comprises a plurality of openings where at least some of the plurality of openings are arranged annularly about the disc.

The actuator preferably comprises a flap corresponding to the at least one opening, the flap being fabricated from a shape memory material and having a shape at a temperature below the determined threshold such that it does not occlude the at least one opening, the flap having a shape at a temperature above the determined threshold such that it does occlude the at least one opening to prevent the passage of fluid through the outlet. The flap is preferably fabricated from a shape memory material that exhibits a two-way memory such that it has a first shape below the predetermined threshold so as not to occlude the at least one opening and has a second shape above the predetermined threshold so as to occlude the at least one opening.

Alternatively, the actuator comprises a flap corresponding to the at least one opening, the flap being fabricated from a shape memory material and having a cupped shape at a temperature below the determined threshold such that it does not occlude the at least one opening, the flap having a flat shape at a temperature above the determined threshold such that it does occlude the at least one opening to prevent the passage of fluid through the outlet. The flap is preferably fabricated from a shape memory material that exhibits a two-way memory such that it has the cupped shape below the predetermined threshold so as not to occlude the at least one opening and has the flat shape above the predetermined threshold so as to occlude the at least one opening.

Still provided is a valve for preventing the flow of fluid when the temperature of the fluid is above a predetermined threshold. The valve comprises: a body having at least one opening for allowing the fluid to pass when the temperature of the fluid is below the predetermined threshold; and a shape memory actuator for substantially closing the at least one opening when the temperature of the fluid is above the predetermined threshold to prevent the fluid from passing. Preferably, the body is disk shaped and the at least one opening comprises a plurality of openings in which case at least some of the plurality of openings are preferably arranged annularly about the disc.

Preferably, the actuator comprises a flap corresponding to the at least one opening, the flap being fabricated from a shape memory material and having a shape at a temperature below the determined threshold such that it does not occlude the at least once opening, the flap having a shape at a temperature above the determined threshold such that it does occlude the at least one opening to prevent the passage of fluid. Preferably, the flap is fabricated from a shape memory material that exhibits a two-way memory such that it has a first shape below the predetermined threshold so as not to occlude the at least one opening and has a second shape above the predetermined threshold so as to occlude the at least one opening.

Alternatively, the actuator comprises a flap corresponding to the at least one opening, the flap being fabricated from a shape memory material and having a cupped shape at a temperature below the determined threshold such that it does not occlude the at least one opening, the flap having a flat shape at a temperature above the determined threshold such that it does occlude the at least one opening to prevent the passage of fluid. Preferably, the flap is fabricated from a shape memory material that exhibits a two-way memory such that it has the cupped shape below the predetermined threshold so as not to occlude the at least one opening and has the flat shape above the predetermined threshold so as to occlude the at least one opening.

Preferably, the valve further comprises a seal disposed between a surface of the body and the actuator for sealing the flow of fluid.

Still provided is a coupling for placement in a fluid conduit. The coupling comprises: a coupling body having an inlet end and an outlet end; and a valve disposed in the coupling body for preventing the flow of fluid from the outlet end when the temperature of the fluid is above a predetermined threshold, the valve having a valve body having at least one opening for allowing the fluid to pass through the outlet end when the temperature of the fluid is below the predetermined threshold, and a shape memory actuator for substantially closing the at least one opening when the temperature of the fluid is above the predetermined threshold to prevent the fluid from passing through the outlet end.

Still provided is a faucet outlet fitting for preventing the flow of fluid from the outlet when the temperature of the fluid is above a predetermined threshold. The fitting comprises: a fitting body having a conduit in fluid communication with the outlet and a threaded portion for fastening to a mating threaded portion on the outlet; and a valve, the valve having a valve body having at least one opening for allowing the fluid to pass through the outlet when the temperature of the fluid is below the predetermined threshold; and a shape actuator for substantially closing the at least one opening when the temperature of the fluid is above the predetermined threshold to prevent the fluid from passing through the outlet.

Still provided is a showerhead for preventing the flow of fluid from a shower outlet when the temperature of the fluid is above a predetermined threshold. The showerhead comprises: a showerhead body having a conduit in fluid communication with the outlet and a threaded portion for fastening to a mating threaded portion on the outlet; and a valve, the valve having a valve body having at least one opening for allowing the fluid to pass through the outlet when the temperature of the fluid is below the predetermined threshold; and a shape memory actuator for substantially closing the at least one opening when the temperature of the fluid is above the predetermined threshold to prevent the fluid from passing through the outlet.

Still further provided is a straw for preventing the flow of fluid when the temperature of the fluid is above a predetermined threshold. The straw comprising: a valve having an open position for dispensing the hot fluid and a closed position for substantially stopping the flow of the hot fluid from the container when a temperature of the hot fluid is more than a predetermined threshold temperature, the valve having a shape memory actuator which changes its shape in response to the hot fluid having a temperature above the threshold, temperature to actuate the valve into the closed position.

Still yet provided is a valve for preventing the flow of fluid when the temperature of the fluid is above a predetermined threshold. The valve comprising: a body having at least one opening for allowing the fluid to pass when the temperature of the fluid is below the predetermined threshold; and a shape memory or bi-metal actuator for substantially closing the at least one opening when the temperature of the fluid is above the predetermined threshold to prevent the fluid from passing.

BRIEF DESCRIPTION OF THE DRAWINGS

These and other features, aspects, and advantages of the apparatus and methods of the present invention will become better understood with regard to the following description, appended claims, and accompanying drawings where:

FIG. 1 illustrates a sectional view of a first lid configuration attached to a container, the first lid having a preferred implementation of a safety valve of the present invention for lids having the first configuration, wherein the safety valve is in an open position.

FIG. 2 illustrates a partial sectional view of the lid and container of FIG. 1 wherein the safety valve is in the closed position.

FIG. 3 illustrates a top view of the lid of FIG. 2.

FIG. 4 illustrates a partial sectional view taken along line 4-4 in FIG. 3.

FIG. 12 illustrates a top view of a second version of the safety valve of FIGS. 8 and 9.

FIG. 13 illustrates a sectional view of the valve of FIG. 12 taken along line 13-13 of FIG. 12.

FIG. 14 illustrates a sectional view of an outlet end of a faucet having a safety valve of the present invention.

DETAILED DESCRIPTION OF THE PREFERRED EMBODIMENT

Figure 5:
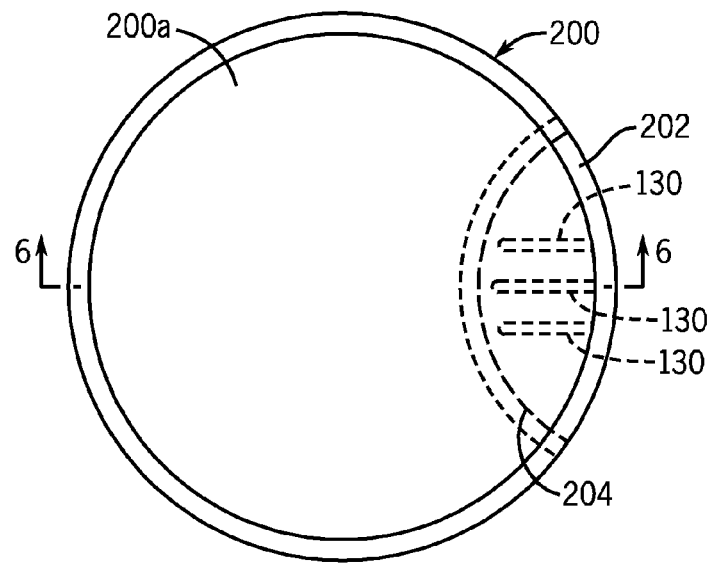
FIG. 5 illustrates a top view of a second lid configuration, the second lid having a preferred implementation of a safety valve of the present invention for lids having the second configuration, wherein the safety valve is in an initial closed position.

Although this invention is applicable to numerous and various types of containers and lids, it has been found particularly useful in the environment of disposable coffee container and lids therefore, for baby bottles, and for plumbing fittings. Therefore, without limiting the applicability of the invention to disposable coffee container and lids therefore, for baby bottles, and for plumbing fittings, the invention will be described in such environment.

Furthermore, although this invention is applicable to different types of actuators, it has been found particularly useful in the environment of shape memory actuators. Therefore, without limiting the applicability of the invention to shape memory actuators, the invention will be described in such environment. For instance, the safety valves described herein can alternatively use a bi-metal actuator which changes shape due to a difference in thermal expansion of the metal comprising the bi-metal strip.

Referring now to FIGS. 1-4, there is shown a first variation of a lid 100 for a container 102 of a hot fluid. The container can be a travel mug, a disposable coffee container or any other container for holding a hot fluid. The container 102 has at least one wall 104 defining a cavity 106 for holding the hot fluid where the lid 100 is disposed on the wall 104 to enclose the cavity 106. The container 102 further has a bottom 108.

The lid 100 has a means to attach to the container 102. The container 102 is preferably a cup, such as a disposable Styrofoam coffee cup where the wall 104 has a peripheral rim 110. The means for attaching the lid 100 to the container 102 preferably comprises a lipped surface 112 extending from a surface 114 of the lid 100 that sealingly engages the peripheral rim 112. Such sealing means are well known in the art of disposable coffee cups.

The surface 114 of the lid 100 has an opening 116 for dispensing the hot fluid. The opening is generally oval shaped, but could be any other shape, such as rectangular or circular without departing from the scope or spirit of the present invention. A valve 118 is provided and has an open position shown in FIG. 1 for dispensing the hot fluid and a closed position shown in FIG. 2 for substantially stopping the flow of the hot fluid from the container 102 when a temperature of the hot fluid is greater than a predetermined threshold temperature. Preferably, the valve 118 has a shape memory actuator 120 that changes its shape in response to the hot fluid having a temperature above the threshold temperature to actuate the valve 118 into the closed position.

Although many shape-memory materials may be used, a nickel-titanium alloy (NiTi) is suitable. One such NiTi alloy is manufactured, for example, by Shape Memory Applications, Inc., Santa Clara, Calif. In general, metallic shape-memory alloys, such as NiTi, CuZnAl, and CuAlNi alloys, undergo a transformation in their crystal structure when cooled from the high-temperature austenite form, which is generally stronger, to the low-temperature martensite form, which is weaker. When a shape-memory material is in its martensitic form, it is easily deformed to a new shape. However, when the material is heated through its transformation temperature, it reverts to austenite and recovers its previous shape with great force. The temperature at which the material reverses its high temperature form when heated can be adjusted by slight changes in material composition and through heat treatment. The shape-memory process can be made to occur over a range of a few degrees, if necessary, and the shape transition can be made to occur millions of times. Heating of the shape memory actuator is accomplished by the transfer of heat from the hot fluid in the container 102.

Some shape-memory materials can be made to exhibit shape-memory only upon heating (one-way shape-memory), or also can undergo a shape change upon cooling (two-way shape memory). Shape-memory materials are available in many forms including, for example, wires, rods, ribbons, strips, sheets, and microtubing, and can be used to fabricate shape-memory structures having linear, planar and composite forms.

In the lid 100 configuration shown in FIGS. 1-4, the valve 118 preferably comprises a flap 122 rotatably disposed on the lid 100 by a hinge 124 between the open and closed positions. When in the closed position as shown in FIG. 2, the flap 122 covers the opening 116 and substantially stops the flow of hot fluid from the container 102. Preferably, the shape memory actuator 120 is disposed at the hinge 124 to rotate the flap 122 upon the change in shape. The valve 118 also has a fixed member 126 adhered to the lid 100, preferably by a heat bond, however, other types of bonds, such as an adhesive or chemical solvent bond can be used. The fixed member 126 of the valve 118 is preferably adhered to a sidewall 128 of the lid 100. The flap 122 is then free to rotate about the hinge 124, which is preferably a living hinge where the fixed member 126, hinge 124, and flap 122 are of integral construction. The valve 118 can optionally have a seal (not shown) between surface 122a of the flap 122 and the lower surface 114a of the lid. Such a seal can be an elastomer affixed or integrally formed on one of the flap surface 122a or lower lid surface 144a. Alternatively, the seal can be a lip (not shown) on one of the flap surface 122a or lower lid surface 114a and corresponding notch (not shown) on the other of the two surfaces 122a, 144a such that when in the closed position, the lip engages the notch to form a seal.

The valve 118 preferably comprises one or more, preferably two shape memory wires 130 which are disposed on the valve 118. The wires 130 are preferably disposed on the lower surface 122a of the flap, across the hinge 124, and on the lower surface 126a of the fixed member 126. The wires 130 preferably have a "one-way" memory such that when heated to above their transition temperature, they try to take a straight shape and thus cause the flap 122 to rotate about the hinge 124 to cover the opening 116. Although the wires 130 can be insert molded into the valve, they are preferably adhered to the valve by any means known in the art, preferably a sticker 132 is used to adhere the wires 130 to the valve 118, as is shown in FIG. 4. If the container 102 is tilted to expose the wires 130 to the hot fluid and if the temperature of the hot fluid in the container 102 is over the threshold temperature (i.e., the transition temperature of the wires 130), the flap 122 will be rotated to cover the opening 116, thereby avoiding a dangerous situation, such as the hot fluid burning the mouth of the person drinking from the container 102. When the temperature of the hot fluid falls to a safe level, the flap 122 can be manually depressed back into the open position shown in FIG. 1. Alternatively, the wires 130 can have a "two-way" memory such that they act to close the valve 118 when heated above the threshold temperature and they also act to open the valve 118 when they cool below the threshold temperature. To facilitate heating the wires 130, an opening 123 is preferably maintained between the flap 122 and fixed member 126 to permit the hot fluid to contact the wires 130.

Figure 6:
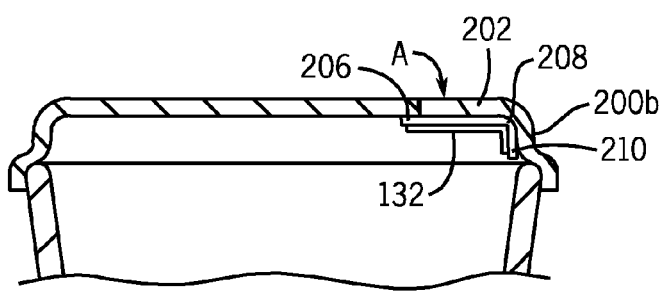
FIG. 6 illustrates a sectional view of taken along line 6-6 in FIG. 5.
Figure 7:
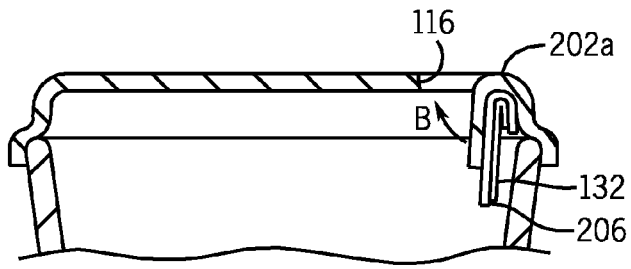
FIG. 7 illustrates the sectional view of FIG. 5 in which the safety valve is in an open position.
Figure 8:
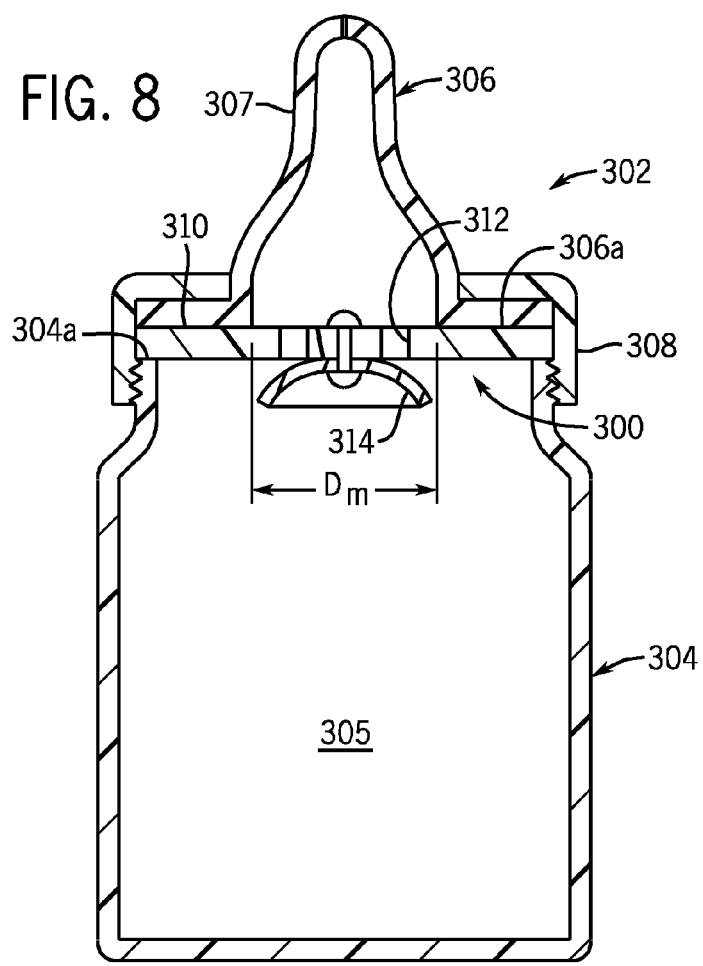
FIG. 8 illustrates a sectional view of a baby bottle configuration having a preferred implementation of a safety valve of the present invention for baby bottles having such a configuration, the safety valve being shown in an open position.
Figure 9:
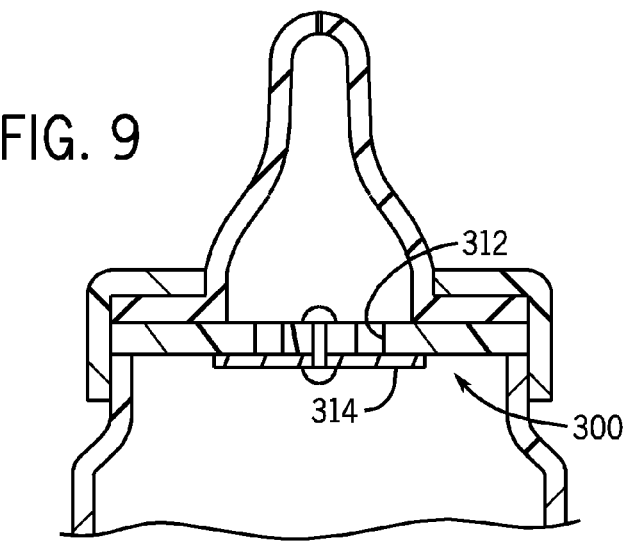
FIG. 9 illustrates a partial sectional view of the baby bottle of FIG. 8 in which the safety valve is shown in a closed position.

Referring now to FIGS. 5-7, there is shown a second variation of a lid 200 for the container 102 of a hot fluid. The second variation of the lid 200 is of the type that has a perforated tab 202 that is preferably semi-circular in shape and has a semi-circular perforation 204. The tab 202, when broken along the perforation 204 and by pushing the tab into the container 102 in the direction of Arrow A assumes an open position as shown in FIG. 7 to allow the hot fluid to be dispensed from the container 102. Preferably, the perforation is only defined along the top surface 200a of the lid 200 and not on a side surface 200b of the lid 200. When so configured, the tab 202 rotates about a living hinge 202a to form the opening and cannot be completely removed from the lid 200.

A flap 206, hinge 208, and fixed member 210, similar to that described with regard to the first variation, is disposed on the underside of the tab 202. The fixed member 210 is adhered to the side surface 200b of the lid 200 such that the flap 206 can rotate about the hinge 208. As is shown in FIGS. 5-7, the flap 206 extends past the perforation 204. Like the first variation, a sticker 132 is adhered to the flap 206 and fixed member 210 to retain the shape memory wires 130 therein. Preferably, three such wires 130 are utilized in the second variation. Although the sticker 132 and wires 130 can be adhered directly to the tab 202, it is preferred to adhere them to the flap 126, which because it is extended past the perforation 204, completely closes the opening 116 when the tab 202 and flap 206 are actuated into the closed position.

Although the safety valve is shown and discussed as being integral with the coffee lid, those skilled in the art will appreciate that it can also be configured as an insert and reused with disposable lids or inserted into a reusable lid and reused after each use. Furthermore, the safety valve can be integral with or an insert to the coffee cup and adapted to cooperate with any lid used thereon.

Also provided is a temperature sensitive valve for preventing the flow of fluid when the temperature of the fluid is above a predetermined threshold. In general, the valve comprises: a body having at least one opening for allowing the fluid to pass when the temperature of the fluid is below the predetermined threshold; and a shape memory actuator for substantially closing the at least one opening when the temperature of the fluid is above the predetermined threshold to prevent the fluid from passing. The shape memory actuator can be integrally formed with the body or preferably disposed on the body by a fastening means, such as a rivet, screw and nut, or although not preferred, by a tacked, brazed, or welded connection.

Referring now to FIGS. 8-11, there is illustrated a first variation of the valve, generally referred to by reference numeral 300. The valve 300 of the first variation is used to prevent the dispensing of fluid from a baby bottle 302 when the temperature of the fluid is above a predetermined threshold. The baby bottle 302 has a bottle portion 304 having a cavity 305 for holding a fluid, such as baby formula. The baby bottle 302 further has a nipple portion 306. The nipple portion 306 is disposed on the bottle portion 304 and is in fluid communication with the cavity 305. The nipple portion 304 having a nipple 307 which when suckled dispenses the fluid. The nipple portion 306 is preferably fastened to the bottle portion 304 by a threaded ring 308. The type of baby bottle configuration shown is given by way of example only and not to limit the scope and spirit of the present invention. Those skilled in the art will realize that any type of baby bottle configuration can be used with the valve 300 of the first variation of the present invention.

Figure 10:
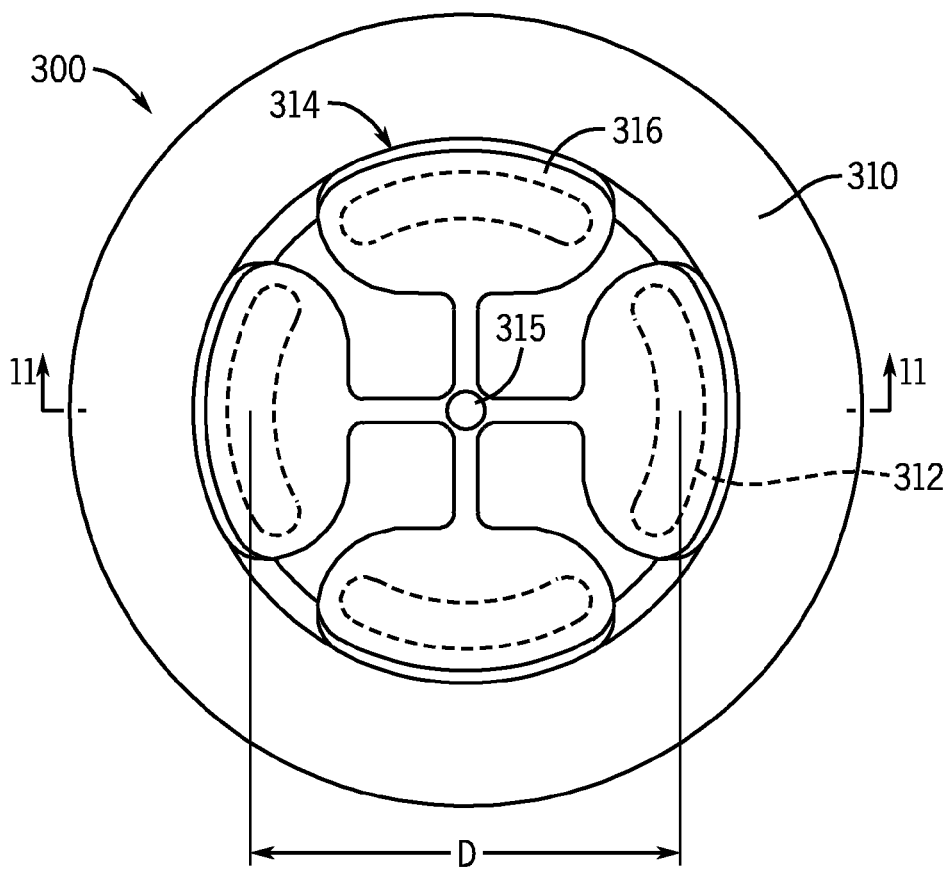
FIG. 10 illustrates a top view of a first version of the safety valve of FIGS. 8 and 9.
Figure 11:
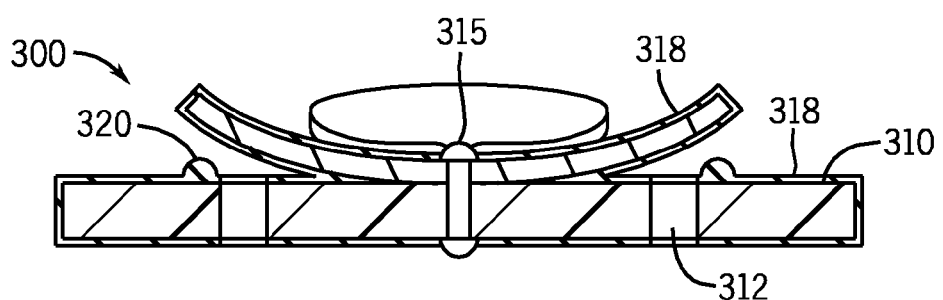
FIG. 11 illustrates a sectional view of the valve of FIG. 10 taken along line 11-11 of FIG. 10.

The valve 300 has a body 310 having at least one opening 312 for allowing the fluid in the bottle portion 304 to pass from the bottle portion 304 of the baby bottle to the nipple portion 306 of the baby bottle when the temperature of the fluid is below the predetermined threshold. The valve body 310 is preferably disk shaped to fit in the mouth of the bottle portion 304 of the baby bottle. Preferably, the valve 300 is retained in the mouth of the baby bottle by sandwiching the body 310 between an upper lip 304a of the bottle portion 304 and a flange 306a of the nipple portion 306. As shown in FIG. 11, a plurality of openings 312 are provided in the body 312. Preferably, at least some of the plurality of openings are arranged annularly about the disc. A preferred configuration of openings 312 is illustrated in FIG. 10. These openings 312 are arcuate slots arranged every 90 degrees about a diameter D. The diameter D is chosen such that the entire openings 312 are within a mouth diameter Dm of the nipple portion 306 such that the openings 312 are not occluded by the flange 306a of the nipple portion 306.

The valve 300 further has a shape memory actuator 314 for substantially closing the at least one opening 312 when the temperature of the fluid is above the predetermined threshold to prevent the fluid from passing from the bottle portion 304 to the nipple portion 306. That is, the shape memory actuator 314 has an open shape, shown in FIG. 8, to allow fluid to pass through the openings 312 when the temperature of the fluid is below the threshold and has a closed shape, shown in FIG. 11, which blocks the openings 312 when the temperature of the fluid is above the threshold. The shape memory actuator 314 is preferably, fabricated from a shape memory material and is preferably shaped as is illustrated in FIG. 10. Although other materials are possible, such as a bimetal strip, shape memory materials are preferred for their strength and for the large forces that can be attained when heated to above their transition temperature. The shape memory actuator 314 is preferably affixed to the body 310 by a fastening means such as a rivet 315, however, other fastening means are possible, such as a screw and nut or a swaged post disposed in a hole. The shape memory actuator 314 may also be spot welded, welded, or brazed to the body 310, although the repeated actuation of the same may cause such fastening means to fail over a period of time. Furthermore, the body 310 and actuator 314 can be of a unitary construction. For instance, the flaps 316 can be stamped from the body 310 to create the openings 312.

The shape memory actuator 314 preferably has a flap 316 corresponding to each opening 312. The flaps 316 are sized and shaped to cover the openings 312 when the shape memory actuator 314 is in the closed position (when the temperature of the fluid is above the threshold or transition temperature) and sized and shaped so as not to occlude the openings when the shape memory actuator 314 is in the open position (when the temperature of the fluid is below the threshold or transition temperature). Alternatively, the shape memory actuator 314 can be cup shaped, as is described below with regard to other variations of the valve of the present invention.

The shape memory actuator 314 is preferably fabricated from a shape memory material which exhibits a two-way memory such that it has the first open shape below the predetermined threshold so as not to occlude the at least one opening and has the second closed shape above the predetermined threshold so as to occlude the at least one opening. Although not preferred, the shape memory actuator 314 can also be fabricated from a shape memory material that exhibits a one-way memory to only close when heated above the predetermined threshold, in which case it would have to be manually opened into the open position.

As shown in FIG. 11, the valve 300 may also have a seal disposed between the body 310 and the actuator 314. Preferably, the seal comprises a rubber or other elastomer coating 318 disposed on at least the portions of the body 310 and actuator 314 that engage when the actuator 314 is in the closed position. Preferably the elastomer coating 318 covers all portions of the valve 300 and can withstand repeated cleaning in a dishwasher. The rubber coating 318 may also have a seal ring 320 that facilitates the liquid seal between the actuator 314 and the body 310. The seal ring 320 can have any number of cross-sectional shapes including curved, square, rectangular or triangular.

Referring now to FIGS. 12 and 13, there is shown a second variation of the valve, generally referred to by reference numeral 400. The second variation of valve 400 is similar in construction to the first variation valve 300 discussed above but has more general applications, particularly in plumbing. In general, the second variation of the valve 400 prevents the flow of fluid from an outlet when the temperature of the fluid is above a predetermined threshold or prevents the flow of fluid in a conduit when the temperature of the fluid is above the predetermined threshold. The valve generally comprises a body 402 having at least one opening 404 for allowing the fluid to pass through the outlet or conduit when the temperature of the fluid is below the predetermined threshold. The valve 400 also has a shape memory actuator 406 for substantially closing the at least one opening 404 when the temperature of the fluid is above the predetermined threshold to prevent the fluid from passing through the outlet or through the conduit.

As discussed above with regard to valve 300, the body 402 is preferably disk shaped and the at least one opening 404 preferably comprises a plurality of openings 404 preferably arranged annularly about the disc body 402. Although the body 402 and actuator 406 can be of unitary construction, as discussed above, it is preferred that they comprise separate pieces and are joined with a fastening means as discussed above, preferably by a rivet 408. Since, the valve 400 has particular utility in plumbing, the body 402 is preferably fabricated from standard plumbing materials, such as copper, and may even be coated with standard plumbing coatings, such as chrome. Also like the valve 300 discussed above, the valve 400 has a sealing means to seal the flow of fluid when the actuator 406 is in the closed position. Preferably the sealing means comprises an o-ring 410 disposed in a corresponding groove 412 on a surface 402*a* of the body 402 that engages the actuator 406 when the actuator 406 is in the closed position. The sealing means may also comprise an elastomer coating on one or both of the actuator 406 and body 402, as discussed above with regard to valve 300.

The valve 400 is preferably positioned in the conduit or outlet such that fluid pressure aids in keeping the actuator 406 in the closed position when the fluid temperature is above the predetermined threshold. The shape of the actuator 406 for the valve 400 of the second variation is preferably cup shaped, although the flap shape discussed above with regard to valve 300 may also be utilized. The cup shaped actuator 406 preferably is concave when below its transition temperature (i.e., below the predetermined threshold temperature) and flat shaped when below the transition temperature. When concave, the actuator 406 does not occlude the openings 404 to permit fluid flow through the valve 400. When flat, the actuator 406 occludes the openings 404 to stop or block the fluid flow through the valve 400. As discussed above, the actuator 406 is preferably a shape memory material but can also be a bi-metal strip. Furthermore, the actuator 406 preferably exhibits two-way memory such that it has the cup shape when below its transition temperature and has the flat shape when above its transition temperature.

Although, the valve has particular utility for liquids, it may also be used to stop the flow of gases when the temperature of the gas is over the predetermined threshold. Furthermore, other shapes in both the open and closed positions are possible for the actuator 406. It only being necessary for the actuator 406 to block the openings 404 in one shape and to unblock the openings 404 in another shape.

Figure 15:
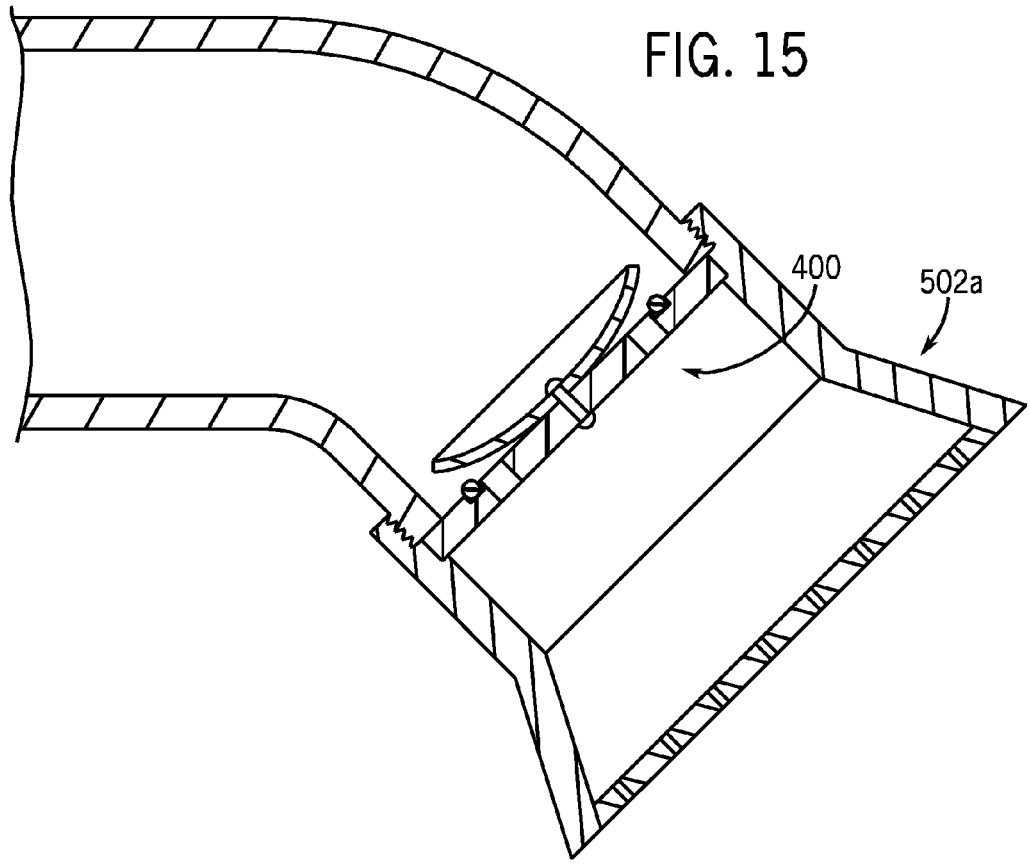
FIG. 15 illustrates a sectional view of an outlet end of a showerhead having a safety valve of the present invention.

Referring now to FIG. 14, there is shown the valve 400 utilized in a faucet 500 and preferably part of an outlet fitting 502 for the outlet 508 of the faucet 500. The outlet fitting 502 is used to prevent the flow of fluid from the outlet 508 when the temperature of the fluid is above a predetermined threshold. The outlet fitting 502 can be utilized for a faucet used with a sink or a bathtub or for other uses to prevent the fluid exiting the outlet 508 from being too hot. The fitting 502 comprises a fitting body 504 having a conduit 506 in fluid communication with the outlet 508 and a threaded portion 510 for fastening to a mating threaded portion 512 on the outlet 508. The valve 400 is disposed in the fitting 502 such that when the actuator 406 is closed to occlude the openings 404, the fluid is prevented from flowing from the outlet 508. Preferably, the body 504 of the outlet fitting 502 has a stepped portion 514 for sandwiching the valve 400 between the stepped portion 514 and a lip 516 of the outlet 508. As discussed above, the valve 400 is preferably positioned with the actuator 406 on the pressurized side of the fluid flow such that the fluid flow tends to aid in closing the actuator 406 when the temperature of the fluid is above the predetermined threshold temperature. FIG. 15 illustrates the outlet fitting configured as a showerhead 502*a* for preventing the flow of fluid from the showerhead when the temperature of the fluid is greater than the predetermined threshold temperature. The outlet fitting or showerhead can also contain a filter for filtering particulate matter from the fluid flow, such as a mesh as is well known in the art.

Figure 16:
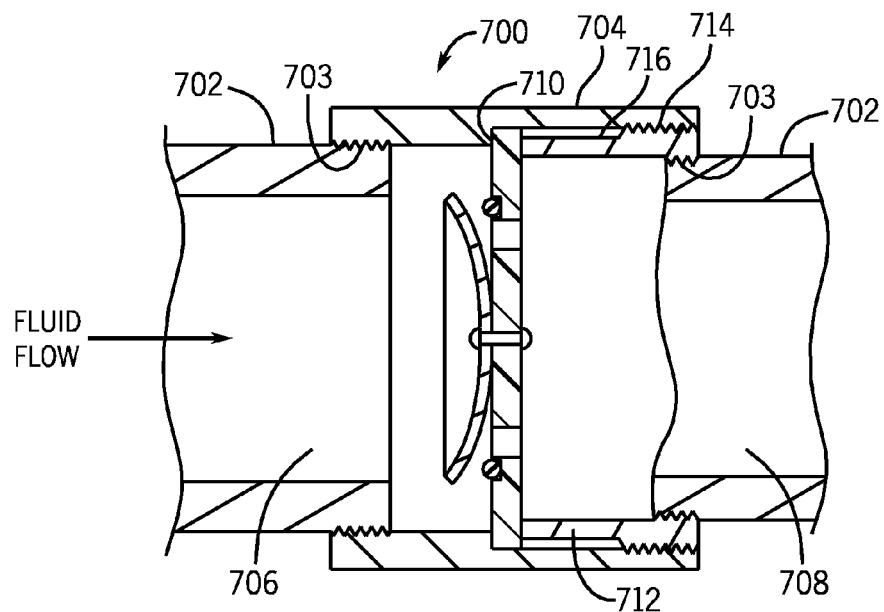
FIG. 16 illustrates a sectional view of a coupling having a safety valve of the present invention.

Referring now to FIG. 16, there is shown a coupling 700 for placement in a fluid conduit 702. The coupling 700 has a valve 400 disposed therein to prevent the flow of fluid in the conduit 702 when the temperature of the fluid is greater than the predetermined threshold temperature. The coupling 700 comprises a coupling body 704 having an inlet end 706 and an outlet end 708. The inlet and outlet ends 706, 708 can connect to the conduit 702 by any means known in the art, such as by a threaded connection 703. The coupling body can be fabricated from any plumbing material known in the art, such as copper, brass, stainless steel, or PVC. The valve is disposed in the coupling body to prevent the flow of hot fluids from the outlet end 708. As discussed above, the valve 400 is preferably positioned with the coupling 700 on the pressurized side of the fluid flow such that the fluid flow tends to aid in closing the actuator 406 when the temperature of the fluid is above the predetermined threshold temperature.

Preferably, the valve 400 is retained in the coupling 700 by sandwiching the same between a stepped portion 710 and a insert 712. The insert 712 is disposed in one of the outlet or inlet ends 706, 708 and facing the stepped portion 710. A seal (not shown) can be provided between the valve body 402 and the coupling body 704 to provide a fluid seal when the actuator 406 is in the closed position. Such a seal can be an o-ring, gasket seal (not shown), or tapered pipe threads. The insert 712 is preferably retained in the body 704 by a threaded connection 714, however any other means for retaining the insert 712 in the body 704 can be used, such as by a weld or adhesive. Preferably, the insert 712 contains an undercut 716 such that its outer wall does not interfere with the inner wall of the body 704.

Figure 17:
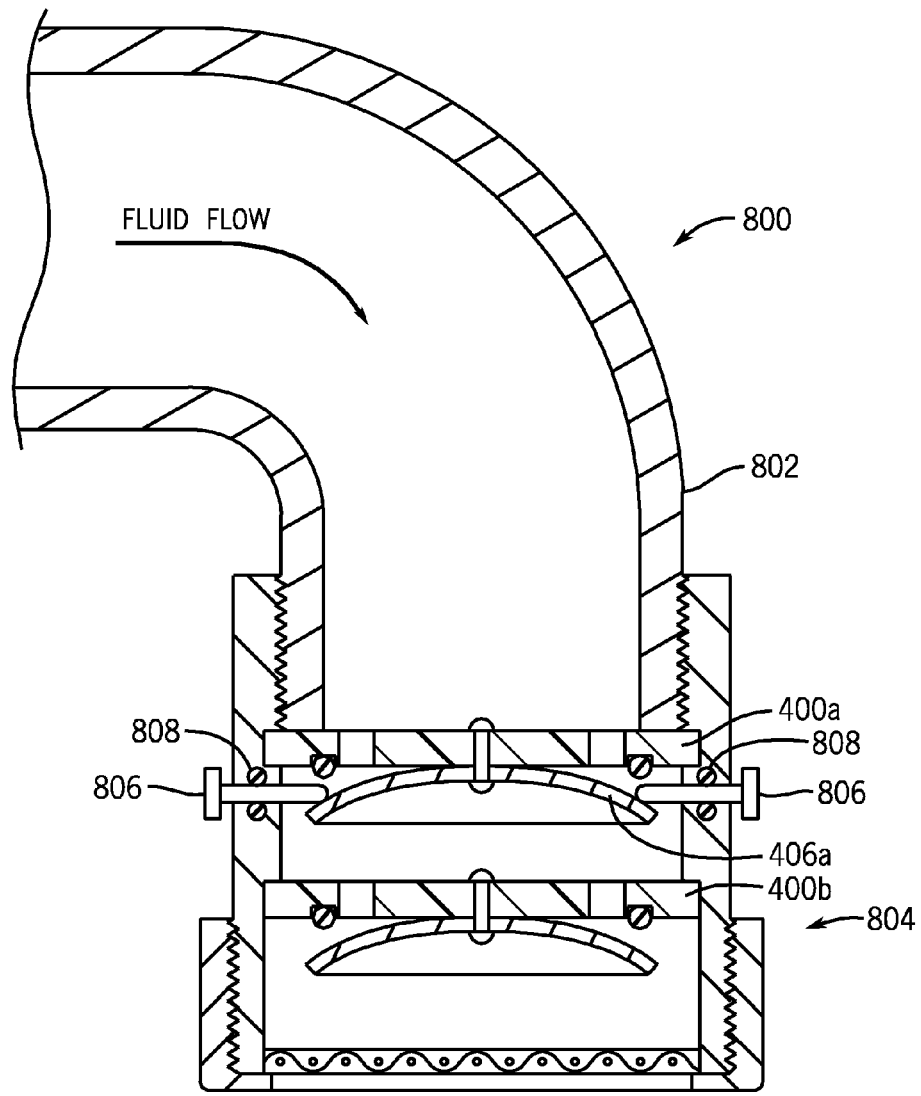
FIG. 17 illustrates a sectional valve of an outlet end of a faucet having two safety valves and a means for disengaging one of the safety valves.

Referring now to FIG. 17, there is shown one example of a means for varying the threshold temperature at which the flow of fluid is stopped. FIG. 17 illustrates a faucet 800 having an outlet 802. An outlet fitting 804, similar to the outlet fitting 502 as discussed above is provided on the outlet end 802. However, the outlet fitting 800 contains more than one valve 400*a*, 400*b*, two of which are shown for simplicity. Valve 400*a* has a predetermined threshold temperature of T1 which is less then the predetermined threshold temperature T2 of the other valve 400*b*. A retaining means is provided to retain the actuator of valve 400*a* in which case the fluid flow is stopped when its temperature is above T2. The retaining means is shown as one or more plungers 806 that can be pushed into engagement with the actuator 406*a* of valve 400*a* to prevent the actuator 406*a* from closing even where the fluid temperature is above T1. The plungers 806 have a seal 808, such as an o-ring to prevent fluid leakage. Those skilled in the art will appreciate that many retaining means can be utilized without departing from the spirit or scope of the present invention. If the retaining means is disengaged, the fluid flow will be stopped when the fluid reaches the T1 temperature.

Those skilled in the art will also appreciate that other configurations for varying the temperature at which the fluid flow is stopped are possible. For instance, the outlet fitting can have more than one valve, each of which has a different threshold temperature at which the fluid flow is stopped. The valves are disposed in an off-center turret design where one of the valves is rotated into a position communicating with the outlet while the others are not in communication with the outlet. In this way, one can select the temperature at which they desire the fluid flow to be stopped by rotating the proper valve into communication with the outlet.

Figure 18:
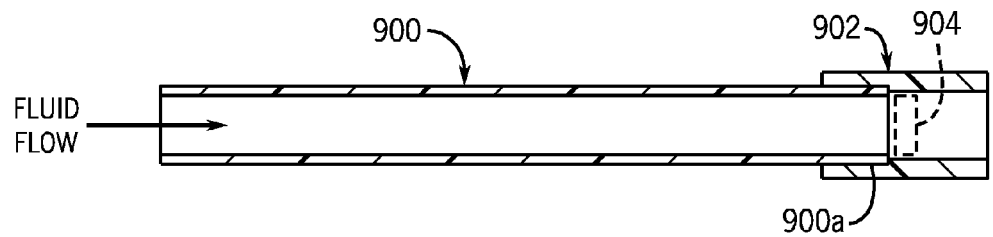
FIG. 18 illustrates a sectional view of a straw having a safety valve insert.

Referring now to FIG. 18, there is shown a straw, generally referred to by reference numeral 900. The straw 900 having an insert 902 disposed thereon, such as by a snug slip fit. The insert 902 having a safety valve 904 fitted therein, the safety valve 904 being shown schematically by dotted line. The safety valve 904 can be configured in any of the ways described above, particularly with regard to that described with the coffee lid. Although, the safety valve 904 is shown incorporated into a reusable insert 902 that is then fitted to the drinking end 900a of the straw 900, the safety valve 904 can alternatively be integral with the straw 900 and disposable with the straw 900. As liquid is sucked through the straw 900 and through the safety valve 904 in the insert 902, if the liquid is below a predetermined temperature, the liquid will continue to flow into the person's mouth. However, if the temperature of the liquid is too hot, i.e., it is above the predetermined temperature, the safety valve will be activated as discussed above to prevent any fluid flow to the person's mouth.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A lid for a container of a hot fluid, the lid comprising:
a surface having an opening for dispensing the hot fluid; and
a valve having an open position for dispensing the hot fluid and a closed position for substantially stopping the flow of the hot fluid from the container when a temperature of the hot fluid is more than a predetermined threshold temperature, the valve having a shape memory actuator comprising a shape memory material which changes its shape in response to the hot fluid having a temperature above the threshold temperature to actuate the valve into the closed position.

2. The lid of claim 1, further comprising means for attaching the lid to the container.

3. The lid of claim 2, wherein the container is a cup having a cavity defined by a wall and a peripheral rim, wherein the means for attaching the lid to the cup comprises a lipped surface extending from the surface which sealingly engages the peripheral rim of the cup.

4. The lid of claim 3, wherein the valve comprises a flap rotatably disposed on the lid by a hinge between the open and closed positions, wherein in the closed position, the flap covers the opening and substantially stops the flow of hot fluid from the cup, the shape memory actuator being disposed at the hinge to rotate the flap upon the change in shape.

5. The lid of claim 4, wherein the opening comprises a push-in tab defined by a perforation in the lid, which when pushed into the lid forms the opening.

6. A container of a hot fluid, the container comprising:
at least one wall defining a cavity for holding the hot fluid;
a lid disposed on the wall to enclose the cavity, the lid having a surface, the surface having an opening for dispensing the hot fluid; and
a valve disposed on one of the wall or lid, the valve having an open position for dispensing the hot fluid and a closed position for substantially stopping the flow of the hot fluid from the container when a temperature of the hot fluid is more than a predetermined threshold temperature, the valve having a shape memory actuator comprising a shape memory material which changes its shape in response to the hot fluid having a temperature above the threshold temperature to actuate the valve into the closed position.

7. The container of claim 6, further comprising means for attaching the lid to the container.

8. The container of claim 7, wherein the container is a cup and having a peripheral rim in fluid communication with the cavity, wherein the means for attaching the lid to the cup comprises a lipped surface extending from the surface of the lid which sealingly engages the peripheral rim of the cup.

9. The container of claim 8, wherein the valve comprises a flap rotatably disposed on one of the wall or lid by a hinge between the open and closed positions, wherein in the closed position, the flap covers the opening and substantially stops the flow of hot fluid from the cup, the shape memory actuator being disposed at the hinge to rotate the flap upon the change in shape.

10. The container of claim 9, wherein the opening comprises a push-in tab defined by a perforation in the lid, which when pushed into the lid forms the opening.

* * * * *